United States Patent
Ur et al.

(10) Patent No.: US 11,301,850 B2
(45) Date of Patent: Apr. 12, 2022

(54) SYSTEM AND METHOD FOR TRANSFERRING AN ANONYMIZED TRANSACTION BETWEEN NODES OF A COMPUTER NETWORK

(71) Applicant: Source Ltd., Valletta (MT)

(72) Inventors: Shmuel Ur, Shorashim (IL); Alon Milner, Kibutz Erez (IL); Ofir Lahav, Ramat Gan (IL)

(73) Assignee: SOURCE LTD., Valletta (MT)

( * ) Notice: Subject to any disclaimer, the term of this patent is extended or adjusted under 35 U.S.C. 154(b) by 143 days.

(21) Appl. No.: 16/416,304

(22) Filed: May 20, 2019

(65) Prior Publication Data

US 2020/0372500 A1  Nov. 26, 2020

(51) Int. Cl.
*G06Q 20/38* (2012.01)
*G06Q 20/06* (2012.01)
*G06Q 20/42* (2012.01)

(52) U.S. Cl.
CPC ........... *G06Q 20/383* (2013.01); *G06Q 20/06* (2013.01); *G06Q 20/42* (2013.01)

(58) Field of Classification Search
CPC .. G06Q 20/40; G06Q 20/383; G06Q 20/4015; G06Q 20/40155; G06Q 20/06; G06Q 20/42; G06Q 20/223; H04L 29/06639; H04L 63/0407
See application file for complete search history.

(56) References Cited

U.S. PATENT DOCUMENTS

| | | | |
|---|---|---|---|
| 8,271,394 B1 * | 9/2012 | Bogaard | G06Q 20/382 705/64 |
| 2009/0070171 A1 * | 3/2009 | Patterson | G06Q 40/00 705/75 |
| 2010/0094735 A1 * | 4/2010 | Reynolds | G06Q 20/24 705/34 |
| 2012/0221421 A1 | 8/2012 | Hammad | |
| 2015/0287021 A1 * | 10/2015 | Itwaru | G06Q 20/3276 705/44 |
| 2019/0066176 A1 | 2/2019 | Warman et al. | |

OTHER PUBLICATIONS

International Search Report for application No. PCT/IL2020/050458, dated Jun. 23, 2020.

* cited by examiner

*Primary Examiner* — Johann Y Choo
(74) *Attorney, Agent, or Firm* — Pearl Cohen Zedek Latzer Baratz LLP (57) ABSTRACT

A system and a method of transferring a transaction between a source node and a destination node of a computer network, by at least one processor of an intermediary node may include: receiving a request to transfer the transaction from the source node to the destination node; extracting from the transaction request at least one data element; obtaining from a first database at least one condition element; anonymizing the transaction; and transferring the anonymized transaction from the intermediary node to the destination node, based on at least one of: the at least one condition element and the at least one extracted data element.

22 Claims, 6 Drawing Sheets

SYSTEM AND METHOD FOR TRANSFERRING AN ANONYMIZED TRANSACTION BETWEEN NODES OF A COMPUTER NETWORK

FIELD OF THE INVENTION

The present invention relates generally to computer communication networks. More specifically, the present invention relates to transferring an anonymized transaction between a first node and a second node of a computer network.

BACKGROUND OF THE INVENTION

State-of-the-art systems for data transmission and routing over computer networks are configured to transfer data from a source node to a destination node, and normally do not take into consideration the content or value of data that may be included in the transaction's payload.

Such limitations are specifically acute in implementations that may include transfer of data that may be sensitive such as in the case of monetary exchange (ME) transactions between two parties (e.g., a merchant and a client).

In such situations, both parties agree on all the details (e.g., a price of a product, terms of payment, etc.). The client may provide properties of a paying mechanism (e.g., a credit card number) and the merchant may forward these properties to a credit card company via an acquirer. The acquirer may request authorization for payment, and once received the information may be communicated back from a bank, to the credit card company to the acquirer and to the merchant, who may provide the product to the user. Such communications are typically all or mostly via computer systems such as servers maintained by the parties.

SUMMARY OF THE INVENTION

State-of-the-art systems do not enable the merchant (e.g. a merchant computer system) to avoid handling or storing the properties of the paying mechanism (e.g., the credit card number).

Moreover, state-of-the-art systems may impose a requirement on the merchant to communicate and/or collaborate with an acquirer, and do not enable the merchant to impose their own priorities on a payment method, such as preferring one payment method (e.g., a first credit card) over another (e.g., a second credit card) for example, by suggesting a more attractive price.

Embodiments of the present invention may include a system and a method of transferring a transaction between a source node and a destination node of a computer network, by at least one processor of an intermediary node.

Embodiments of the method may include:
receiving a request to transfer the transaction from the source node to the destination node;
extracting from the transaction request at least one data element;
obtaining from a first database at least one condition element;
receiving from the source node a transaction corresponding to the request anonymizing the transaction; and
transferring the anonymized transaction from the intermediary node to the destination node, based on at least one of: the at least one condition element and the at least one extracted data element.

The at least one extracted data element may be selected from a list consisting of:
a value of a first user property, pertaining to a first user associated with the source node;
a value of a second user property, pertaining to a second user, associated with the destination node;
a value of a product property; and
a value of a logistic indicator.

Embodiments of the invention may include anonymizing the transaction by excluding at least one value of the first user property from the requested transaction.

According to some embodiments, the transaction may be a monetary exchange (ME) transaction. Embodiments of the method may include anonymizing the transaction so as not to include properties of the first user.

The at least one extracted data element further may include a reference to an entry in a second database. Embodiments of the method may include:
presenting a query to the second database, pertaining to a value of the at least one product property;
obtaining a response from the second database; and
analyzing the response to verify the value of the at least one product property.

Embodiments of the method may include transferring the anonymized transaction to the destination node based on the verification of the value of the at least one product property.

The transaction may be a monetary exchange transaction, and the at least one condition element may pertain to the monetary exchange transaction. Additionally, or alternately, the at least one condition element may be or may include, for example:
a second product property;
a commission; and
an acceptable method of payment.

Embodiments of the invention may include sending at least one first notification message to a computing device associated with the first user before transferring the anonymized transaction, so as to enable the first user to approve the anonymized transaction.

Additionally, or alternately, embodiments may include sending at least one second notification message to a computing device associated with the second user. The at least one second notification message may be sent before transferring the transaction, so as to enable the second user to approve the transaction.

The at least one second notification message may pertain to one or more anonymized transactions, and may include one or more data elements, including for example: a second product property and a logistic element.

Embodiments of the present invention may include a system for transferring a transaction between a first node and a second node of a computer network. Embodiments of the system may include: a non-transitory memory device storing instructions; and a processor, associated with the memory device, and configured to execute the modules of instruction code. Upon executing the instructions code, the processor may be configured to:
receive a request to transfer the transaction from the source node to the destination node;
extract from the received transaction request at least one data element;
obtain from a first database at least one condition element;
receive from the source node a transaction corresponding to the request;
anonymize the transaction; and
transfer the anonymized transaction to the destination node, based on at least one of: the at least one condition element and the at least one extracted data element.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may include a method and a system for transferring an anonymized transaction between a first node and a second node of a computer network.

Figure 1:
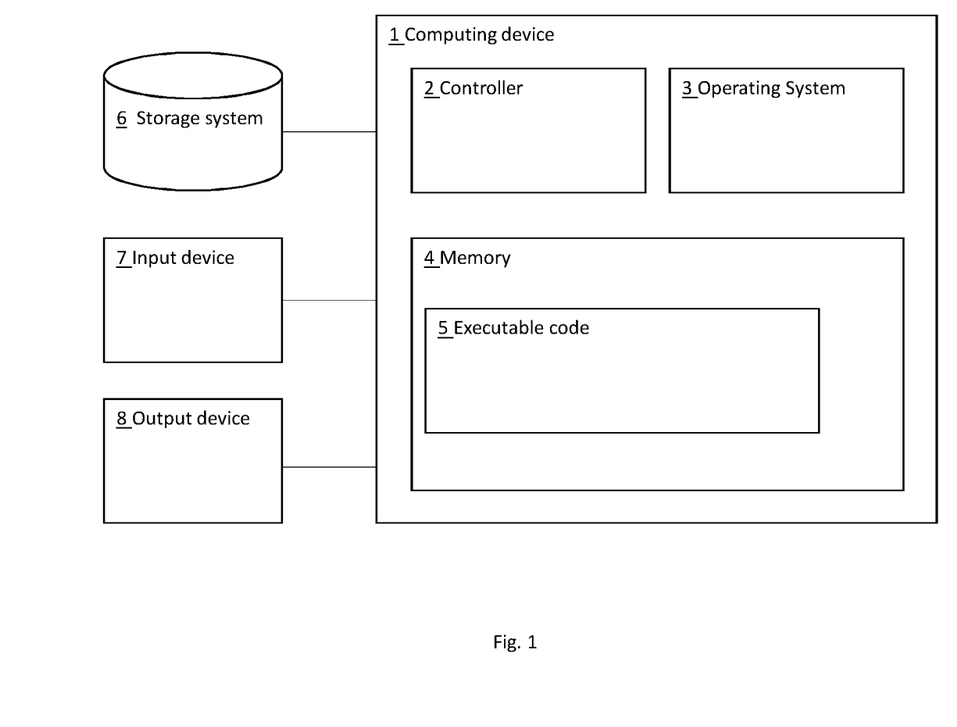
FIG. 1 is a block diagram, depicting a computing device which may be included in a system for transferring an anonymized transaction between a first node and a second node of a computer network according to some embodiments.

Reference is now made to FIG. 1, which is a block diagram depicting a computing device, which may be included within an embodiment of a system for transferring an anonymized transaction between a first node and a second node of a computer network, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may transfer, transmit or send an anonymized transaction between a first node and a second node of a computer network as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The following Table 1 includes a list of terms used throughout this document for the reader's convenience:

TABLE 1

| | |
|---|---|
| Node | The term 'Node' may be used herein to refer to a computerized system, used for processing and/or routing data related to or describing transactions within a network of nodes, connected by network equipment as discussed herein. Nodes may include, for example: an individual computer (e.g. including components similar to those in FIG. 1, or other components) or a server in an organization and a site operated by an organization (e.g. a data center or a server farm operated by an organization which also may include components such as in FIG. 1 or other components). For example, in monetary exchange (ME) transactions, nodes may include a server in a banking system, a computer of a paying-card issuer, etc. |
| Transaction | The term 'transaction' may be used herein to refer to communication of data between a source node and a destination node of a computer network. A transaction may include sending and/or routing a data structure from the source node to the destination node, across the computer network, possibly via intermediate nodes and/or links, and using computer networking equipment such as a router, a gateway, a switch and the like, as known in the art. The term transaction may also refer herein to a data structure(s) and/or data payload representing a transaction. According to some embodiments, transactions may include a single, one-way transfer of data between a source node and a destination node. For example: a first server may propagate at least one data file to a second server as a payload within a transaction. Alternately, transactions may include a plurality of data transfers between the source node and the destination node. For example, a transaction may be or may include a monetary exchange between two institutions (such as banks), operating computer servers and computer equipment, where in order to carry out the transaction data needs to be transferred between the servers and other computer equipment operated by the institutions. |
| Transaction payload, Transaction data structure | The term 'payload' may be used herein to refer to at least one content or data element that may be included in a transaction, including for example a data structure that may be sent from the source node to the destination node. Payloads may include, for example: information included within the transaction (e.g. parameters of a financial transaction, such as a sum and a currency of a monetary exchange), a data file sent over the transaction, etc. |
| Transaction request | The term "Transaction request" may be used herein to refer to a request that may be placed by a user, for a transaction between a source node and a destination node of a computer network. For example, a user may initiate a request to perform a monetary exchange transaction, between a source node (e.g. a server of a first bank) and a destination node (e.g. a server of a second bank). |
| User | The term 'user' may be used herein to refer to an individual or an organization that may be associated with the source node and/or the destination node of the computer network. Pertaining to an example of a monetary exchange transaction: a first user may be a client or a customer that may have or may be associated with a first bank account that may be handled by a source node that is a first banking server. a second user may be merchant that may have or may be associated with a second bank account that may be handled by a source node that is a second banking server. |
| User property | The term "user property" may be used herein to refer to one or more characteristics pertaining to a specific user, including for example the user's name, an identification number, a bank account number, an email address, a phone number and the like. |
| Product, product property | The term 'product' may be used herein to refer to any transferrable commercial goods, including for example substantial products and/or services. Accordingly, properties of a product may include for example, a price, terms of payment, terms of shipment and the like. |
| Condition element | The term "condition element" may be used herein to refer to one or more data elements associated with a parameter or characteristic of a transaction. For example, in embodiments where the transaction is a monetary exchange (ME) transaction, a condition element may be a condition that may be imposed by one or more nodes of the network, including for example: a list of acceptable paying methods (e.g., acceptable paying cards), a commission and/or an offer relating to one or more acceptable paying methods and the like. |

Figure 2A:
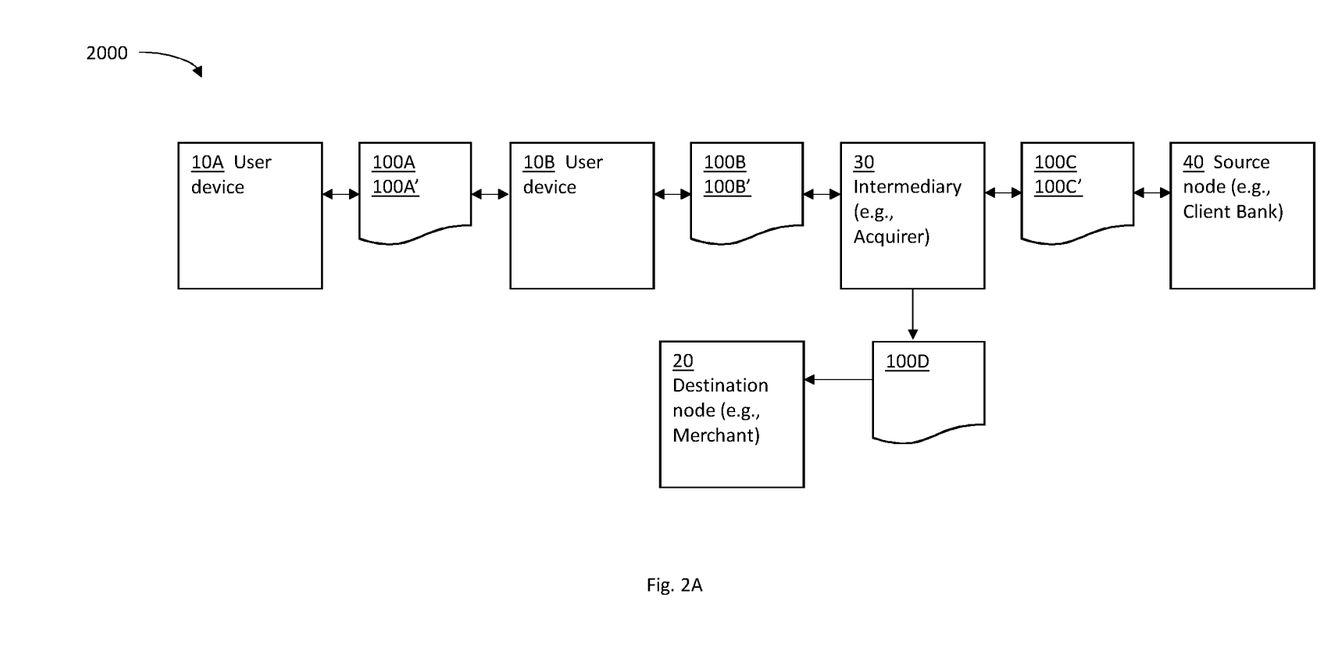
FIG. 2A is a block diagram, depicting a system for transferring a transaction between a source node and a destination node of a computer network as known in the art.
Figure 2B:
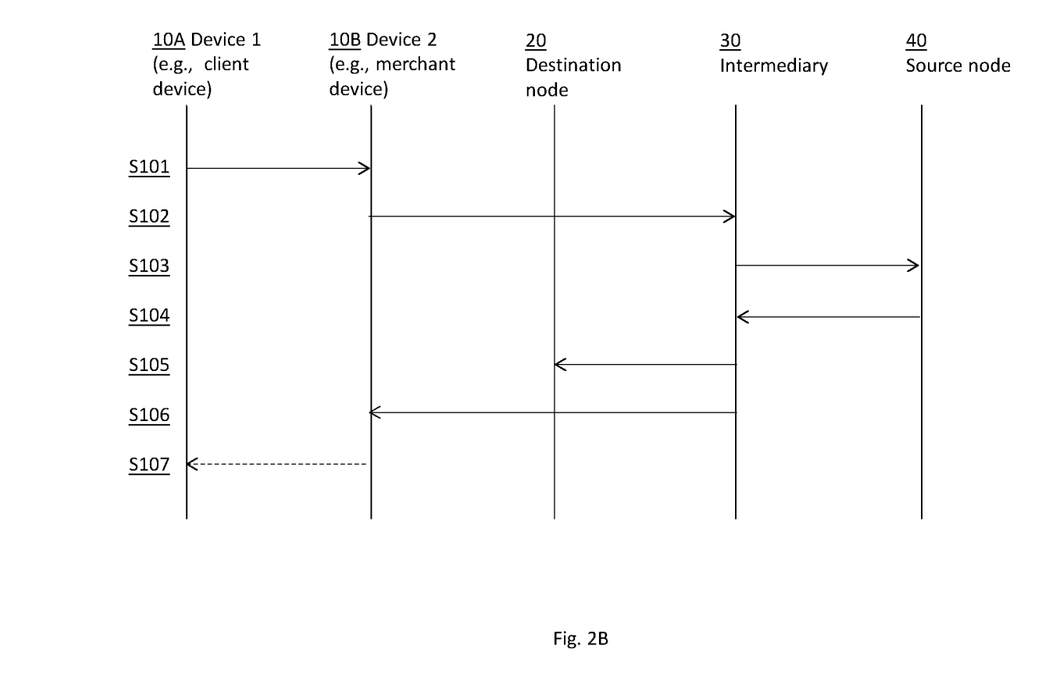
FIG. 2B is a transaction flow diagram, depicting a method for transferring a transaction between a source node and a destination node of a computer network as known in the art.

Reference is now made to FIG. 2A, which is a block diagram, depicting a system for transferring a transaction between a source node and a destination node of a computer network 2000 as known in the art and to FIG. 2B, which is transaction flow diagram, depicting a method for transferring a transaction between a source node and a destination node of a computer network 2000 as known in the art.

As shown in FIGS. 2A and 2B, commercially available systems for transferring a transaction between a source node and a destination node of a computer network 2000 may require that a first user (e.g., a client) that may be associated with a first computing device 10A and a second user (e.g., a merchant) that may be associated with a second computing device 10B will agree to details of the transaction. For example, in cases where the transaction is a monetary exchange (ME) transaction, where a product may be purchased in return to a monetary value, the client and the merchant should both agree on properties of a product including for example, the product's identification, price, terms of payment, etc.

For example, as shown in step S101, a first user (e.g., a client) may use a first user operating a computing device 10A (e.g., a smartphone) such as computing device 1 of FIG. 1, to connect (e.g., via one or more computer networks such as the internet) to a second computing device 10B such as device 1 of FIG. 1. Second computing device 10B (e.g., a web server that may handle an online shopping site) may be associated with a second user (e.g., a merchant). The first user may provide information (e.g., their paying card details) 100A via the connection (e.g., via the internet), as known in the art.

In another example, the first computing device 10A may be a paying card reader, and the second computing device 10B may be a vending machine. The first user may provide information (e.g., their paying card details) 100A via the paying card reader, to the second computing device 10B (e.g., the vending machine), as known in the art.

As shown in steps S102 and S103, second computing device 10B may forward the information 100B (e.g., credit card details) to an intermediary node 30 (such as an acquirer node). Intermediary node 30 (e.g., the acquirer) may in turn forward the information 100C to a source node 40 (e.g., a credit card company).

As known in the art, source node 40 (e.g., the credit card company) may communicate (e.g., via a credit card issuer) with at least one additional node (e.g., a banking server where the client's bank account may be managed). Source node 40 may request payment authorization from the at least one additional node (e.g., the banking server) and may receive an acknowledgement (e.g., a clearance for payment) from the at least one additional node (e.g., the banking server). This element of the transaction is not depicted in FIGS. 2A and 2B for the purpose of simplicity.

As shown in step S104, source node 40 (e.g., the credit card company) may return an acknowledgement 100C' (e.g., a clearance for payment) to intermediary node 30 (e.g., the acquirer).

As shown in step S105, intermediary node 30 may transfer, send or transmit a transaction 100D (e.g., a payment) to a destination node 20 (e.g., a banking server that may handle the merchant's bank account).

As shown in step S106, intermediary node 30 may transfer a notification 100B' (e.g., a clearance of payment) to second computing device 10B associated with the second user (e.g., the online shopping website server or the vending machine).

As shown in step S107, second computing device 10B may proceed to serve the first user 100A' (e.g., provide, deliver or ship the product) according to the specific context of the transaction (e.g., shopping from and online server or purchasing a product from a vending machine).

State-of-the-art systems for transferring transactions such as ME transactions where a product may be purchased for example, from an online shopping website or from an unattended vending machine may present several limitations or disadvantages, from at least the second user's (e.g., the merchant's) point of view.

For example, ME transactions may require the existence of a merchant-side computing device 10B. This requirement may not be feasible in specific scenarios, such as where the product (e.g., a sandwich) may be left unattended (e.g., at a fair stand) and where the first user (e.g., a client) is trusted to pay for a product he may take.

Furthermore, second computing device 10B may be required to accommodate regulatory restrictions for maintaining or storing information that pertains to properties of the first user, including for example the user's bank account, credit card number and the like.

Embodiments of the present invention provide a practical application for transferring anonymized transactions between a source node that may be associated with the first user (e.g., a server of the user's credit card company and/or a banking server where the user's bank account is held) and a destination node (e.g., a computing device associated with a merchant), so as to bypass the elaborated limitations or disadvantages.

Figure 3A:
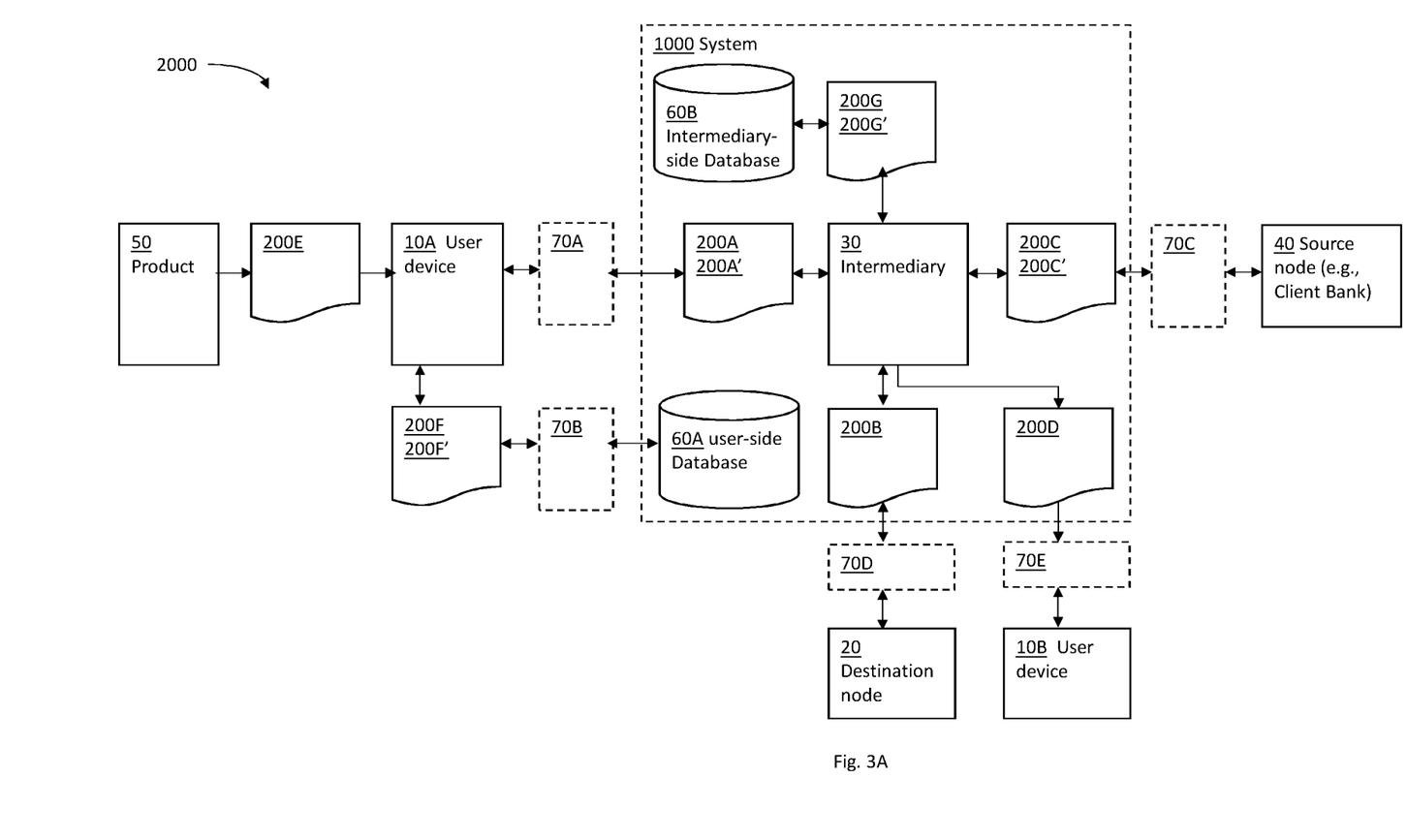
FIG. 3A is a block diagram, depicting a system for transferring an anonymized transaction between a source node and a destination node of a computer network, according to some embodiments of the invention.
Figure 3B:
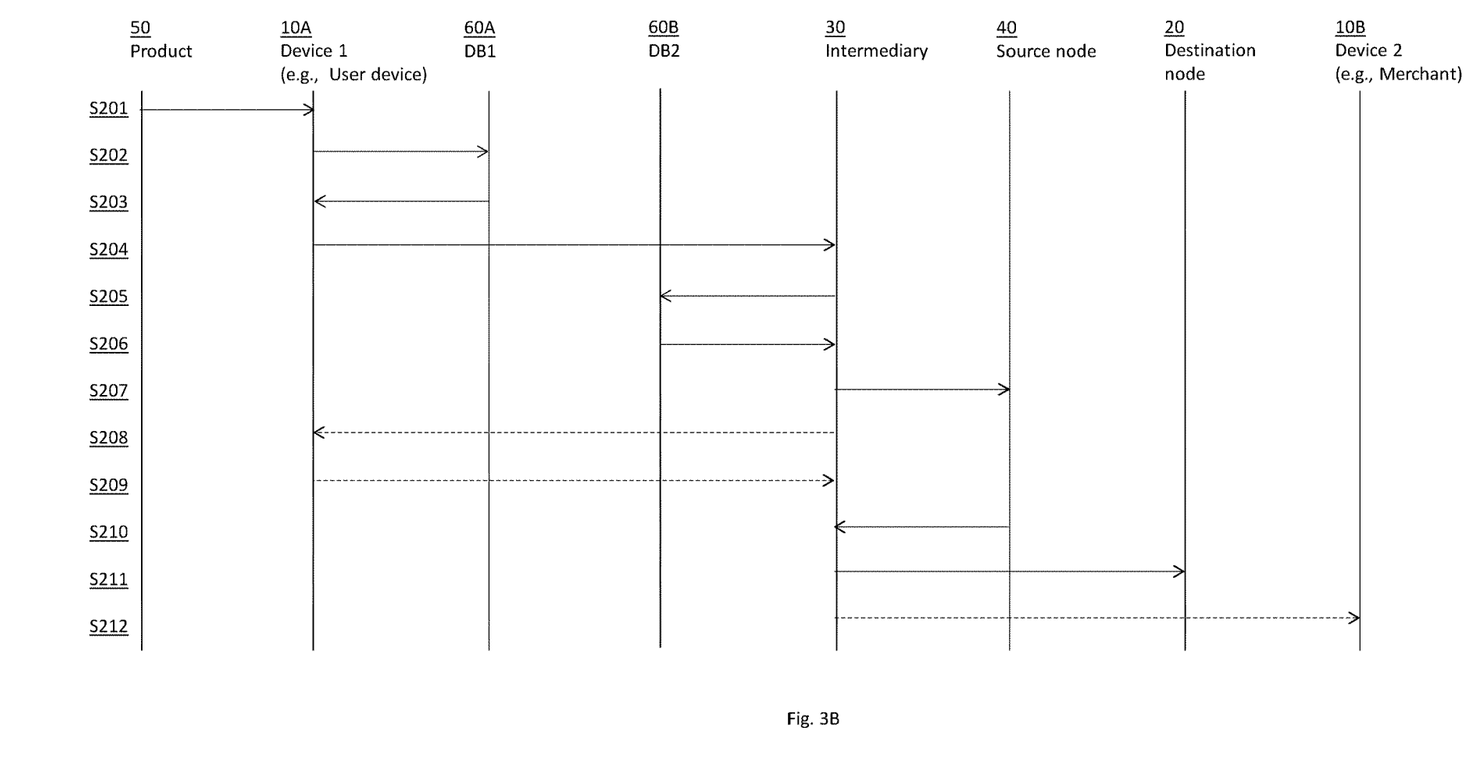
FIG. 3B is a transaction flow diagram, depicting a method for transferring an anonymized transaction between a source node and a destination node of a computer network, according to some embodiments of the invention.

Reference is now made to FIG. 3A, which is a block diagram, depicting a system 1000 for transferring an anonymized transaction between a source node 40 and a destination node 20 of a computer network 2000, by at least one processor of an intermediary node 30, according to some embodiments of the invention. Reference is also made to FIG. 3B, which is a transaction flow diagram, depicting steps of a method for transferring the anonymized transaction between source node 40 and destination node 20 of the computer network, 2000 according to some embodiments of the invention.

Computer network 2000 may be or may include for example a local area network (e.g., an Ethernet network), a wide area network (e.g., the Internet), a cellular network and or any combination thereof. As shown in FIG. 3A, computer network 2000 may include one or more computing devices or nodes 70 (e.g., 70A, 70B, 70C, 70D, 70E), such as routers, gateways, switches and the like, for transferring or routing transactions among elements of system 1000 and/or network 2000, as known in the art.

The example brought in FIGS. 3A and 3B relates to a monetary exchange (ME) transaction, in which money may be transferred between a first user that may be a client and a second user that may be a merchant in exchange to a product 50, however it is to be known that embodiments of the invention may be implemented in other configurations to reliably transfer anonymized transactions between a first entity and a second entity.

In the example depicted in FIGS. 3A and 3B:

source node 40 may be for example, a first banking server handling a bank account of a client and/or a server of a credit card issuer associated with the credit card of the client;

destination node 20 may be for example, a second banking server handling a bank account of a merchant; and intermediary node 30 may be for example, an acquirer server, that may maintain the merchant's bank account, as known in the art.

As shown in step S201 a first user, associated with a first user device or computing device 10A (e.g., the user's smartphone) may obtain at least one reference or pointer to an entry in a user-side database 60A that may be associated with a product 50. For example, product 50 (e.g., a sandwich that may be offered on an unattended stand) may be associated with or may include computer-readable data (e.g., a barcode, a Quick Response (QR) code and the like) that may include a reference 200E (e.g., a Uniform Resource Locator (URL)) to the entry in user-side database 60A, as known in the art. The first user may employ the first user device 10A to read the computer-readable data (e.g., scan the barcode by an appropriate application), to obtain reference 200E to the entry in user-side database 60A, as known in the art.

As shown in steps S202 and S203, first user device 10A may utilize reference 200E to communicate with user-side database 60A and obtain from the respective entry one or more data elements 200F pertaining to or associated with product 50.

According to some embodiments, data elements 200F may include at least one user-side product property, including for example a product type (e.g., a type of a sandwich) a product price, one or more possible payment options (e.g., by one or more paying cards) and the like.

Additionally, or alternately, in a case where the product is a substantial product that may be offered to the first user to freely take, and for which the first user may be trusted to pay (e.g., cookies or sandwiches in an unattended stand), data elements 200F may include at least one logistic indicator pertaining to the product. The logistic indicator may include for example, information that may allow keeping track of product sales (e.g., keeping stock), such as the location of the offered product (e.g., from which unattended stand the sandwich was taken), amount of products of a specific type in stock, total amount of products in stock, amount of products of a specific type presented for sale, total amount of products presented for sale, etc.

Additionally, or alternately, data elements 200F may include at least one user property or data item pertaining to the second user. For example, in a case of an ME transaction, data elements 200F may include a number or identifier of a bank account associated with a merchant (e.g., the seller of sandwiches).

Additionally, or alternately, data elements 200F may include a reference (e.g., a URL) to an intermediary node 30. For example, in a case where the transaction is an ME transaction, intermediary node 30 may be a computing device (e.g., element 1 of FIG. 1) such as a server associated with or belonging to an acquirer.

The term intermediary may be used in this context to indicate that intermediary node 30 may facilitate a role of a buffer or a hub between a first side of a transaction, e.g., a user that may interface a source node (e.g., their credit card issuer, via a first computing device 10A) and a second side of the transaction, e.g., a merchant that may interface a destination node (e.g., their banking server via a second computing device 10B), as explained herein. In some embodiments, intermediary node 30 may communicate with at least one of source node 40 and destination node 20 to facilitate the transaction (e.g., transfer of at least one anonymized transaction payload or data structure) between source node 40 and destination node 20, as explained herein.

As shown in step S204, the first user may send, by the first user device 10A (e.g., the user's smartphone) to intermediary node 30 a request 200A to transfer the transaction (e.g., transfer funds) from the source node to the destination node. Transferring the transaction typically involves transferring, transmitting or sending a data structure describing the transaction from node to node.

Pertaining to the example of the purchase of a product (e.g., a sandwich from an unattended stand), the transaction may be an ME transaction to transfer money from source node 40 (e.g., the client's card issuer and/or bank account) to the destination node 20 (e.g., the merchant's bank account). Accordingly, request 200A may be or may include a data structure that may include for example one or more of:

an identification of the client's card issuer and/or bank account;
an identification of the merchant's bank account;
a type of a transaction (e.g., a single payment, a monthly payment, etc.); and
a price of the purchased product (e.g., the sandwich).

As elaborated herein, intermediary node 30 may subsequently transmit or send an anonymized version 200B of the requested transaction to destination node 20. The anonymized version 200B may be or may include a data structure that may describe the transaction from source node 40 to destination node 20 and may be devoid of information that may belong or may define a user and/or their respective user device 10A. For example, transaction 200B may be or may include a data structure that may include for example one or more of:

the identification of the merchant's bank account;
the type of a transaction; and
the amount of money paid for the purchased product (e.g., the sandwich).

Intermediary node 30 may receive request 200A to transfer the transaction from source node 40 to destination node 20 and may process the request as explained herein.

According to some embodiments, request 200A may include a value of a first user property, pertaining to the first user associated with the source node. For example, in implementations where the transaction is an ME transaction, source node 40 may be for example, a banking server handling a bank account of the first user and/or a server of a credit card issuer associated with the credit card of the first user. The value of a first user property may accordingly be a bank account number of the first user and/or a credit card number of the first user (e.g., the client).

Additionally, or alternatively, request 200A may include a value of a second user property, pertaining to a second user, associated with the destination node. For example, in implementations where the transaction is an ME transaction, destination node 20 may be for example a banking server handling a bank account of a merchant. The value of the second user property may accordingly be a bank account number of the second user (e.g., the merchant).

Additionally, or alternatively, request 200A may include a value of a user-side product property, as obtained from user-side database 60A. Pertaining to the example of the unattended sandwich stand, the value of the user-side product property may be the type of sandwich and its price.

Additionally, or alternatively, request 200A may include a value of a logistic indicator, as obtained from user-side database 60A. Pertaining to the example of the unattended sandwich stand, the value of the logistic indicator may be the location (e.g., a number of a specific stand) where the sandwich is presented.

Additionally, or alternatively, request 200A may include reference 200E (e.g., a URL) to the respective entry in user-side database 60A. As elaborated herein, intermediary 30 may use reference 200E to verify that information presented to the first user by user-side database 60A (e.g., a price of a product) matches the information that will be included in the transaction between source node 40 and destination node 20 (e.g., a monetary sum that will be exchanged between source node 40 and destination node 20).

According to some embodiments, intermediary node 30 may receive transaction request 200A and extract or copy therefrom at least one data element, including for example the one or more first user property value, the one or more second user property value, the one or more user-side product property value and/or the one or more logistic indicator value.

As shown in steps S205 and 206, intermediary node 30 may communicate 200G with an intermediary-side database 60B and obtain therefrom at least one condition element 200G'. For example, in implementations where the transaction is an ME transaction, the at least one condition element may pertain to the monetary exchange transaction, and may include for example:

one or more intermediary-side product properties;

one or more acceptable methods of payment (e.g., a credit card and/or debit card that may be used for the ME transaction); and one or more commission rates that may be imposed by intermediary node 30 for transferring the transaction (e.g., commission rates that may be specific to one or more methods of payment).

In some embodiments, at least one condition element 200G' may be utilized to impose a prioritization on one or more parameter of the transaction. For example, in implementations where the transaction is an ME transaction, a merchant may impose priorities on a payment method, such as preferring one payment method (e.g., a first credit card type) over another (e.g., a second credit card) by suggesting a more attractive price when using the preferred payment method. Intermediary node 30 may be configured to communicate with first computing device 10A and configure computing device 10A to present the payment method of the higher priority (e.g., suggest executing the ME transaction using the preferred credit card).

Intermediary node 30 may communicate with source node 40 and may receive from source node 40 a transaction corresponding to transaction request 200A. For example, assume that transaction request 200A is a request for an ME transaction and may include a transfer of a monetary value from source node 40 to destination node 20. Intermediary node 30 may communicate with source node 40 to deliver the transaction request to source node 40, and receive a transaction corresponding to transaction request 200A (e.g., for transfer of the same monetary value) that is destined to, or targeted at destination node 20, as elaborated herein.

As shown in step S207, intermediary node 30 may communicate 200C with source node 40 based on the first user property value. For example, in implementations where the transaction is an ME transaction, intermediary node 30 (e.g., an acquirer server) may communicate 200C with source node 40 (e.g., a card issuer and/or a banking server) based on the first user property value (e.g., a credit card number of the client). Communication 200C may correspond to request 200A in a sense that it may include information originating from transaction request 200A. In this example, communication 200C may include a request for payment authorization of a monetary value included in transaction request 200A, from source node 40 (e.g., the banking server and/or card issuer) to destination node 20 (e.g., a banking server associated with a merchant).

As shown in step S210, intermediary node 30 (e.g., the acquirer) may receive transaction 200C' (e.g., an acknowledgement and/or clearance for payment) from source node 40 (e.g., the card issuer and/or banking server).

Additionally, or alternatively, communication 200C of intermediary node 30 may include a command and/or a configuration for source node 40. Source node 40 may be configured to respond to command 200C by sending a transaction 200C' corresponding with transaction request 200A, from source node 40 via intermediary node 30 to destination node 20.

Pertaining to the example of the ME transaction, transaction request 200A may include a request to transfer a specific amount of money between source node 40 and destination node 20. Communication 200C may include a command or an order to source node 40 (e.g., the card issuer and/or banking server) to perform an action. In this example, intermediary node 30 may command source node 20 to process a payment, or transfer of funds (e.g., pending authorization of the request for payment as elaborated above). Source node 40 may be configured react to command 200C by sending a payment transaction 200C' via intermediary node 30 to destination node 20 (e.g., a banking server handling a merchant's bank account).

According to some embodiments, intermediary node 30 may be configured to receive transaction 200C' and anonymize the transaction. For example, intermediary node 30 may exclude, blank, or remove one or more data elements pertaining to user properties or identification of the first user, or alter such elements to be anonymous. Anonymization may have the effect of making it difficult or impossible for a third party to identify a certain party to the transaction, or to connect the transaction to a certain party. In some embodiments, the at least one processor of intermediary node 30 may exclude at least one value of the first user property (e.g., the client) from the requested transaction.

For example, in implementations where the transaction is an ME transaction, the at least one processor of intermediary node 30 may be configured to anonymize the transaction so as not to include properties of the first user such as the first user's name, credit card number, bank account number, phone number and the like. Intermediary node 30 may, in this case delete one or more fields that include properties of the first user (e.g., a bank account number) and that may be included in transaction request 200A so that the data structure or transaction payload may be shorter. Additionally, or alternately, intermediary node 30 may input a blank space, or a value that is clearly not correct in a personal data field (e.g. XXXXX for a name).

As shown in step S211 intermediary node 30 (e.g., the acquirer) may transfer or transmit the anonymized transaction 200B from intermediary node 30 to destination node 20. Transfer of anonymized transaction 200B may be based on or according to at least one of: the at least one condition element and the at least one data element copied, taken or extracted from transaction request 200A. For example, the requirements of a condition element may be compared to a data element and if the requirement is met, the transfer takes place, and if the requirement is not met, the transfer does not take place.

Destination node 20 may receive anonymized transaction 200B and may be configured to react thereto according to the specific implementation.

For example, in implementations where the transaction is an ME transaction, anonymized transaction 200B may include (e.g., as a transaction payload) a monetary value that may be the same as or equivalent to (e.g., in a condition of a currency change) to the product price (e.g., as included in the one or more user-side product properties in transaction request 200A). Destination node 20 may be in this example a banking server handling a merchant's bank account and may receive anonymized ME transaction 200B. destination node 20 may react to transaction 200B by crediting the merchant's bank account by the monetary value included in the transaction.

In another example where the transaction is an ME transaction, a monetary value that may be equal to the commission imposed by intermediary node 30 (e.g., as included in the one or more condition element) may be deducted from the anonymized transaction 200B.

In another example where the transaction is an ME transaction, intermediary node 30 may avoid sending cause not to be sent anonymized transaction 200B to destination node 20, if for example credit card details (as included in the first user's properties in transaction request 200A) do not conform with the one or more acceptable methods of payment (as included in the one or more condition element). Alternately, or additionally, if intermediary node 30 (e.g., an acquirer) is configured not to permit ME transactions using a specific type of credit card (e.g., Visa), then intermediary node 30 may not send anonymized transaction 200B to destination node 20, and may thus prevent completion of the ME transaction with the restricted credit card.

In another example where the transaction is an ME transaction, intermediary node 30 may compare at least one user-side product property (e.g., as obtained by first user device or computing device 10A from user-side database 60A and included in transaction request 200A) and a respective at least one respective intermediary-side product property (e.g., as obtained from intermediary-side database 60B), to verify that information presented to the first user by user-side database 60A (e.g., a price of a product) matches the information that will be included in the transaction between source node 40 and destination node 20 (e.g., a monetary sum that will be exchanged between source node 40 and destination node 20).

In some embodiments, intermediary node 30 may utilize reference 200E to user-side database 60A, to present a query to user-side database 60A pertaining to a value of the at least one user-side product property (e.g., a price of the product as presented to the client on first computing device 10A). Intermediary node 30 may obtain a query response from user-side database 60A and may analyze the response to verify the value of the at least one product property (e.g., a price) as presented to the first user (e.g., the client) on their computing device (e.g., their smartphone).

The one or more processors of intermediary node 30 may be configured to transfer anonymized transaction 200B to destination node 20 based on or according to the verification of the value of the at least one product property. For example, if the verification is positive, the transaction may be sent, and if the verification is negative, the transaction may not be sent.

According to some embodiments, as shown in steps S208 and S209, at least one processor of intermediary node 30 may be configured to send at least one user notification message 200A' to a computing device (e.g., first device 10A) that may be associated with the first user (e.g., the client). User notification message 200A' may be sent prior to transferring the anonymized transaction 200B to destination node 20, so as to enable the first user (e.g., the client) to approve the anonymized transaction.

Alternately, or additionally, intermediary node 30 may configure first computing device 10A to present or display (e.g., on a screen such as output device 8 of FIG. 1) to the first user (e.g., the client) one or more data elements pertaining to the transaction and allow the user to select or interact with the presented data.

For example, intermediary node 30 may configure first computing device 10A to present one or more intermediary-side product properties (e.g., a price for which the client's bank account will be charged) and enable the user to verify or confirm that they wish to purchase the product. Intermediary node 30 may subsequently proceed with handling the transaction, as elaborated herein, according to the user's approval (e.g., transfer the anonymized transaction to destination node 20 only if the client approves to do so).

In another example, intermediary node 30 may configure first computing device 10A to present or display one or more condition elements pertaining to methods of payment (e.g., a first price or commission for using a first paying card, a second price or commission for using a second paying card, etc.) and enable the user to select (e.g., by choosing a graphical representation on the screen) their preferred method of payment. Intermediary node 30 may subsequently proceed with handling the transaction, as elaborated herein, according to the user's choice (e.g., communicate with a source node 40, such as a card issuer that may be associated with a selected payment card).

As shown in step S212, the at least one processor of intermediary node 30 may be configured to send at least one second notification message 200D to a second computing device 10B associated with the second user (e.g., the merchant).

According to some embodiments, the at least one second notification message 200D may pertain to or be associated with one or more anonymized transactions 200B and may include for example one or more respective intermediary-side product properties and one or more respective logistic elements, so as to notify the second user of one or more condition elements pertaining to one or more transactions.

For example, intermediary node 30 may send second notification message 200D before transferring anonymized transaction 200B, so as to configure second user device 10B (e.g., associated with or belonging to a merchant) to display a message that may prompt the user (e.g., the merchant) to approve the anonymized transaction. Second user device 10B may receive the user's approval and may transmit the approval to intermediary node 30 which may subsequently transfer anonymized transaction 200B to destination node 20.

In another example, intermediary node 30 may send second notification message 200D to a user's (e.g., the merchant) smartphone according to a predefined condition (e.g., after a predefined number or percentage of products have been sold) so as to keep track of transactions (e.g., keep track of stock).

In another example, second notification message 200D may include a logistical element such as a location of one or more presented products. This may enable intermediary node 30 to notify the user (e.g., the merchant) via second user device or computing device 10B as to the location of successful (e.g., busy) or unsuccessful (e.g., empty) point of sale.

In another example, intermediary node 30 may send second notification message 200D to a user's (e.g., the merchant's) second computing device 10B (e.g., a smartphone) at a predefined timing (e.g., at the end of a day). This may enable intermediary node 30 to summarize transactions at the predefined time (e.g., summarize sales and income at the end of the day).

It may be appreciated by a person skilled in the art that embodiments of the present invention may provide methods for controlling transfer of anonymized transactions between source node(s) 40 and destination node(s) 20 of a computer network 2000, in implementations that may not necessarily include monetary exchange including for example, polling (e.g., in a public poll or survey) or election (e.g., between political candidates) systems.

For example, in a scenario of a municipal election campaign (e.g., where candidates are voted for office as mayors of municipalities), one or more citizens may use their respective user devices 10A to select a specific political candidate. This selection may for example, be done by selecting one of a plurality of candidates via a dedicated software application that may be executed on computing devices 10A of the respective of citizen or user. Request 200A may be sent from device 10A to intermediary node 30 and may include one or more data elements pertaining to the citizen's identity (e.g., their name, identification number, etc.) and their selection (e.g., their preferred candidate).

Intermediary node 30 may be, in such embodiments, a computing device (e.g., a server) that may be associated with a central elections' comity, and intermediary-side database 60B may hold information pertaining to candidates, parties and electorates pertaining to each municipality (e.g., which candidates are electable at each municipality).

Intermediary node 30 may forward request 200A as a message 200C to source node 40, which may, in this example, be a computing device (e.g., a server) that may be associated with a civil registrar, and may hold a list of eligible voters (e.g., citizens permitted to vote according to their notionally, age, registered residence, etc.).

As elaborated herein, intermediary node 30 may control or configure source node 40 to perform an action. In this example of a municipal elections' scenario, intermediary node 30 may configure source node 40 to:

ascertain whether a specific citizen is eligible for voting;

maintain a record pertaining to each voter, to determine whether the voter has already voted (e.g., to prevent double voting); and return a voting transaction 200C', including for example an approval for voting, via intermediary node 30 to one or more destination nodes 20 (e.g., servers pertaining to municipalities where voting takes place).

Intermediary node 30 may receive transaction 200C' from source node 40 and may:

analyze received transaction 200C' in view of at least one condition element;

anonymize the received transaction 200C'; and forward an anonymized version 200B of transaction 200C' to one or more destination nodes 20.

Pertaining to the municipal elections example, intermediary node 30 may:

analyze received voting transaction 200C' in view of at least one condition element by verifying that the user's request complies with the data included in intermediary side database 60B (e.g., that the user has selected a candidate representing a municipality where the voter is registered);

anonymize voting transaction 200C' (e.g., omit the voter's name or identification number) to produce anonymized transactions 200B; and send anonymized transactions 200B to one or more relevant or respective destination nodes 20 (e.g., servers that pertaining to the specific municipality for which the user has voted).

The one or more relevant or respective destination nodes 20 may be configured to react to anonymized transaction 200B. Pertaining to the elections example, the one or more relevant or respective destination nodes 20 may count the incoming votes and determine the winners of the elections.

Thus, embodiments of the invention may transfer one or more transactions (e.g., voting requests of one or more users), from a source node 20 (e.g., the civil registrar server) to a destination node (e.g., a server of a specific municipality) in a manner that:

may be controlled or restricted by a configuration of intermediary node 30 (e.g., only if the user is eligible to vote at the requested municipality); and anonymized to exclude information (e.g., voter's identification details) that should not be handled or maintained by destination node 20.

Figure 4:
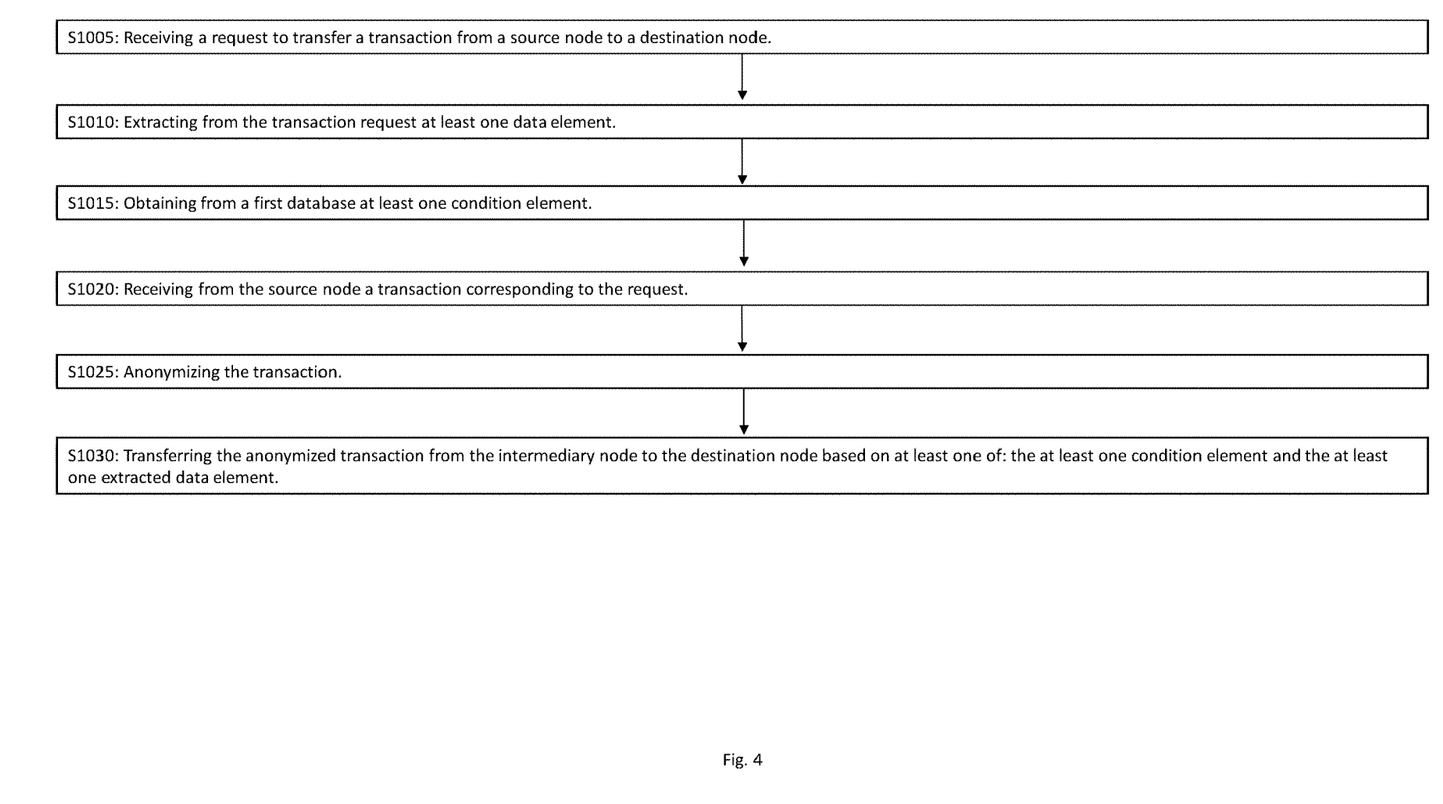
FIG. 4 is a flow diagram, depicting a method for transferring an anonymized transaction between a source node and a destination node of a computer network, according to some embodiments of the invention.

Reference is now made to FIG. 4, which is a flow diagram, depicting a method for transferring an anonymized transaction between a source node (e.g., element 40 of FIG. 3A) and a destination node (e.g., element 20 of FIG. 3A) of a computer network (e.g., element 2000 of FIG. 3A), by at least one processor (e.g., element 2 of FIG. 1) of an intermediary node (e.g., element 30 of FIG. 3A), according to some embodiments of the invention.

As shown in step S1005, the at least one processor 2 of intermediary node 30 may receive a request (e.g., element 200A of FIG. 3A) to transfer a transaction from source node 40 to destination node 20. For example, request 200A may be or may include a request to transfer an ME transaction that may include transfer of funds or money from source node 40 (e.g., a server handling a first bank account) to a destination node 20 (e.g., a second server handling a second bank account).

As shown in step S1010, the at least one processor 2 of intermediary node 30 may extract from the transaction request at least one data element. Pertaining to the example of the ME transaction, processor 2 may extract, for example:

one or more user properties pertaining to a first user (e.g., the first user's bank account, the user's credit card number, etc.)

a reference (e.g., an IP address) of source node 40 (e.g., a baking server handling the first user's bank account);

one or more user properties pertaining to a second user (e.g., the second user's bank account)

a reference (e.g., an IP address) of destination node 20 (e.g., a baking server handling the second user's bank account); and a monetary value that needs to be transfer from source node 40 to destination node 20.

As shown in step S1015, the at least one processor 2 of intermediary node 30 may obtain from a first database (e.g., element 60B of FIG. 3A) at least one condition element. Pertaining to the example of the ME transaction, the at least one condition element may be any condition that may be imposed on the ME transaction, including for example a commission that may incur on the monetary transfer, a list of one or more acceptable credit cards (e.g., that intermediary node 30 may accept for the purpose of the monetary transaction), and the like.

The at least one processor 2 of intermediary node 30 may communicate with source node 40 (e.g., element 200C of FIG. 3A). As shown in step S1020, source node 40 may respond to communication 200C, and intermediary node 30 may receive from source node 40 a transaction (e.g., element 200C' of FIG. 3A) corresponding to request 200A. Pertaining to the example of the ME transaction, communication 200C may be a request to transfer the monetary value included in request 200A from source node 40 via intermediary node 30 to destination node 20.

As shown in step S1025, the at least one processor 2 of intermediary node 30 may anonymize the received transaction 200C'. Pertaining to the example of the ME transaction, processor 2 of intermediary node 30 may anonymize the transaction so as not to include properties of the first user, such as the first user's name, credit card number and/or bank account number as elaborated herein.

As shown in step S1030, the at least one processor 2 of intermediary node 30 may transfer the anonymized transaction (e.g., element 200B of FIG. 3A) from intermediary node 30 to destination node 20, based on at least one of: the at least one condition element (e.g., only if an acceptable credit card was used) and the at least one extracted data element (e.g., transfer the monetary value between the first bank account and the second bank account).

Embodiments of the invention include several improvements over state-of-the-art technology for transferring transactions between a source node and a destination node of a computer network.

For example, embodiments may allow the destination node to act as a passive receiver. In embodiments where the transaction is an ME transaction (e.g., as in the unattended stand example) this may provide a practical application that may enable a merchant not to be connected to the network (e.g., work offline) during the sale process or even omit any computing device from the point of sale, while maintaining the ability to be payed and to maintain inventory for the sold products.

In another example, embodiments may enable reliable transfer of anonymized transactions. In embodiments where the transaction is an ME transaction, the client may be anonymized from the merchant's point of view. This may provide a practical application for merchants (e.g., small-scale merchants) that may avoid regulatory and/or resource (e.g., hardware and/or software) related restrictions that may be associated with maintaining and/or handling of sensitive user information such as user identities, credit card numbers, bank account numbers and the like. In fact, the merchant may be omitted from the transaction altogether, so as to keep the flow of sensitive information between the client and an acquirer node, rather than between the client and the merchant, as commonly performed by commercially available systems.

As elaborated herein, embodiments may further include a feedback from intermediary node 30 to the first user regarding fruition of the transaction. In embodiments where the transaction is an ME transaction (e.g., in return to purchase of a product from an unattended point of sale), this may provide a practical application for providing a presentable proof of purchase to the client.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, features or elements of different embodiments may be used with or combined with other embodiments.

The invention claimed is:

1. A method of transferring a transaction between a source node and a destination node of a computer network, by at least one processor of an intermediary node, the method comprising:
receiving, by the processor, a transaction request to transfer the transaction from the source node to the destination node;
wherein transferring the transaction comprises transmitting, from the source node to the destination node, a data structure that describes the transaction;
extracting, by the processor, from the received transaction request at least one data element;
obtaining, by the processor, from a first database at least one condition element;
communicating, by the processor, the transaction request to the source node based on at least one of: the at least one data element and the at least one condition element;
receiving, by the processor, from the source node a transaction corresponding to the transaction request;
anonymizing, by the processor, the transaction; and
transferring, by the processor, the anonymized transaction from the intermediary node to the destination node, based on at least one of: the at least one condition element and the at least one extracted data element.

2. The method of claim 1, wherein the at least one extracted data element is selected from a list consisting of:
a value of a first user property, pertaining to a first user associated with the source node;
a value of a second user property, pertaining to a second user, associated with the destination node;
a value of a product property; and
a value of a logistic indicator.

3. The method of claim 2, further comprising anonymizing the transaction by excluding at least one value of the first user property from the requested transaction.

4. The method of claim 3, wherein the transaction is a monetary exchange transaction, and wherein the method further comprises anonymizing the transaction so as not to include properties of the first user.

5. The method of claim 2, wherein the at least one extracted data element further comprises a reference to an entry in a second database, and wherein the method further comprises:
presenting a query to the second database, pertaining to a value of the at least one product property;
obtaining a response from the second database; and
analyzing the response to verify the value of the at least one product property.

6. The method of claim 5, further comprising transferring the anonymized transaction to the destination node based on the verification of the value of the at least one product property.

7. The method of claim 1, wherein the transaction is a monetary exchange transaction, and wherein the at least one condition element pertains to the monetary exchange transaction, and is selected from a list consisting of:
a second product property;
a commission; and
an acceptable method of payment.

8. The method of claim 1, further comprising sending at least one first notification message to a computing device associated with the first user before transferring the anonymized transaction, so as to enable the first user to approve the anonymized transaction.

9. The method of claim 1, further comprising sending at least one second notification message to a computing device associated with the second user.

10. The method of claim 9, wherein the at least one second notification message is sent before transferring the transaction, so as to enable the second user to approve the transaction.

11. The method of claim 9, wherein the at least one second notification message pertains to one or more anonymized transactions, and wherein the at least one second notification message comprises one or more data elements, selected from a list consisting of a second product property and a logistic element.

12. A system for transferring a transaction between a first node and a second node of a computer network, the system comprising:
a non-transitory memory device storing modules of instruction code; and
a processor, associated with the memory device, and configured to execute the modules of instruction code, such that when the processor executes the modules of instruction code, the processor is configured to:

receive a transaction request to transfer the transaction from the source node to the destination node;
- wherein transferring the transaction comprises transmitting, from the source node to the destination node, a data structure that describes the transaction;

extract from the received transaction request at least one data element;

obtain from a first database at least one condition element;

communicate the transaction request to the source node based on at least one of: the at least one data element and the at least one condition element;

receive from the source node a transaction corresponding to the transaction request;

anonymize the transaction; and transfer the anonymized transaction to the destination node, based on at least one of: the at least one condition element and the at least one extracted data element.

13. The system of claim 12, wherein the at least one extracted data element is selected from a list consisting of:
- a value of a first user property, pertaining to a first user associated with the source node;
- a value of a second user property, pertaining to a second user, associated with the destination node;
- a value of a product property; and
- a value of a logistic indicator.

14. The system of claim 13, wherein the processor is further configured to anonymize the transaction by excluding at least one value of the first user property from the requested transaction.

15. The system of claim 14, wherein the transaction is a monetary exchange transaction, and wherein the processor is further configured to anonymize the transaction so as not to include properties of the first user.

16. The system of claim 13, wherein the at least one extracted data element further comprises a reference to an entry in a second database, and wherein the processor is further configured to:

present a query to the second database, pertaining to a value of the at least one product property;

obtain a response from the second database; and analyze the response to verify the value of the at least one product property.

17. The system of claim 16, wherein the processor is further configured to transfer the anonymized transaction to the destination node based on the verification of the value of the at least one product property.

18. The system of claim 12, wherein the transaction is a monetary exchange transaction, and wherein the at least one condition element pertains to the monetary exchange transaction, and is selected from a list consisting of:
- a second product property;
- a commission; and
- an acceptable system of payment.

19. The system of claim 12, wherein the processor is further configured to send at least one first notification message to a computing device associated with the first user before transferring the anonymized transaction, so as to enable the first user to approve the anonymized transaction.

20. The system of claim 12, wherein the at least one processor is further configured to send at least one second notification message to a computing device associated with the second user.

21. The system of claim 20, wherein the at least one second notification message is sent before transferring the transaction, so as to enable the second user to approve the transaction.

22. The system of claim 20, wherein the at least one second notification message pertains to one or more anonymized transactions, and wherein the at least one second notification message comprises one or more data elements, selected from a list consisting of a second product property and a logistic element.

* * * * *